W. I. TWOMBLY.
LUBRICATING SYSTEM FOR ROTARY ENGINES.
APPLICATION FILED OCT. 23, 1911.

1,073,374.

Patented Sept. 16, 1913.
3 SHEETS—SHEET 1.

Witnesses:
Howard C. Thompson
Percy A. Smith

Inventor:
Willard Irving Twombly,
By John O. Seifert,
his Attorney

W. I. TWOMBLY.
LUBRICATING SYSTEM FOR ROTARY ENGINES.
APPLICATION FILED OCT. 23, 1911.

1,073,374.

Patented Sept. 16, 1913.

3 SHEETS—SHEET 3.

Witnesses:
Howard Thompson
Percy A. Smith

Inventor:
Willard Irving Twombly,
By John A. Seifert,
his Attorney

UNITED STATES PATENT OFFICE.

WILLARD IRVING TWOMBLY, OF NEW YORK, N. Y., ASSIGNOR TO TWOMBLY MOTORS COMPANY, OF NEW YORK, N. Y., A CORPORATION OF NEW YORK.

LUBRICATING SYSTEM FOR ROTARY ENGINES.

1,073,374.  Specification of Letters Patent.  Patented Sept. 16, 1913.

Application filed October 23, 1911. Serial No. 656,317.

*To all whom it may concern:*

Be it known that I, WILLARD IRVING TWOMBLY, a citizen of the United States, residing in the borough of Manhattan, in the city, county, and State of New York, have invented new and useful Improvements in Lubricating Systems for Rotary Engines, of which the following is a specification.

This invention relates to rotary engines, and particularly to a lubricating system therefor, and it is the object of the invention to provide an improved lubricating system in which the lubricant is caused to flow by gravity to the bearings and a distributing reservoir, and is caused to flow by centrifugal action from said distributer to the walls of the cylinders to lubricate the pistons, means being provided to regulate the flow of the lubricant and to automatically shut off the same when the engine is at rest.

With this object in view, I provide a casing, having a series of cylinders secured thereto, to rotate about a fixed crank shaft, coöperating piston mechanism being connected to the crank pin of the shaft to rotate about the same with the cylinders. The casing is provided with a lubricant distributing reservoir connected to the cylinders, needle valves being provided in the connections of the cylinders with the distributer to regulate the flow of lubricant, and check valves are also provided in said connections to shut off the flow of lubricant when the engine is at rest. The lubricant is fed by gravity to the distributer and the engine bearings through a duct in the shaft connected to a lubricant supply tank.

Figure 1:
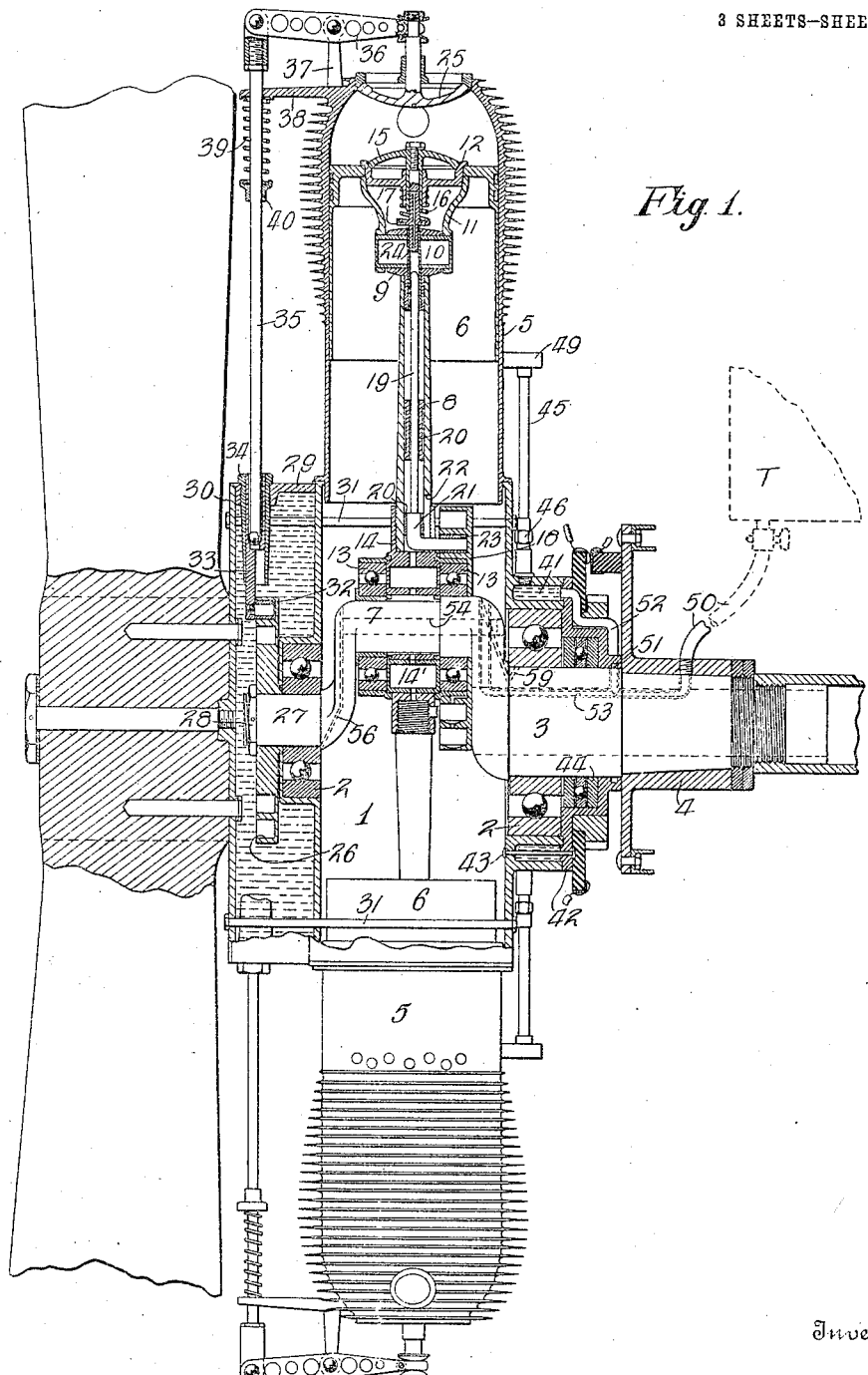
Figure 2:
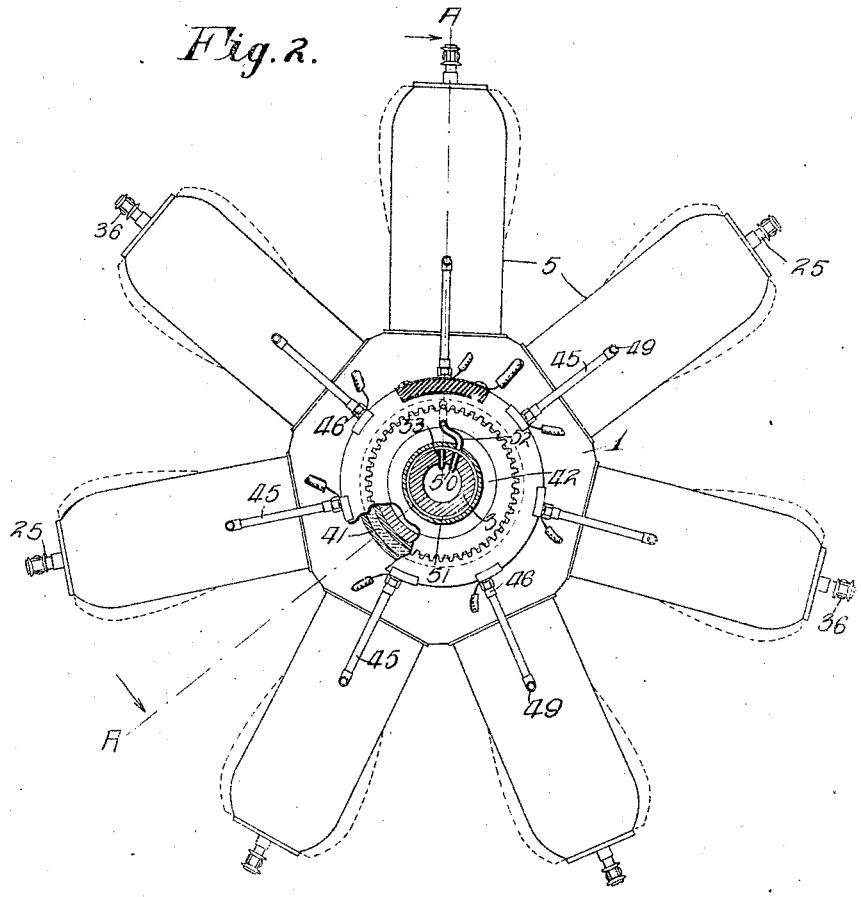
Figure 3:
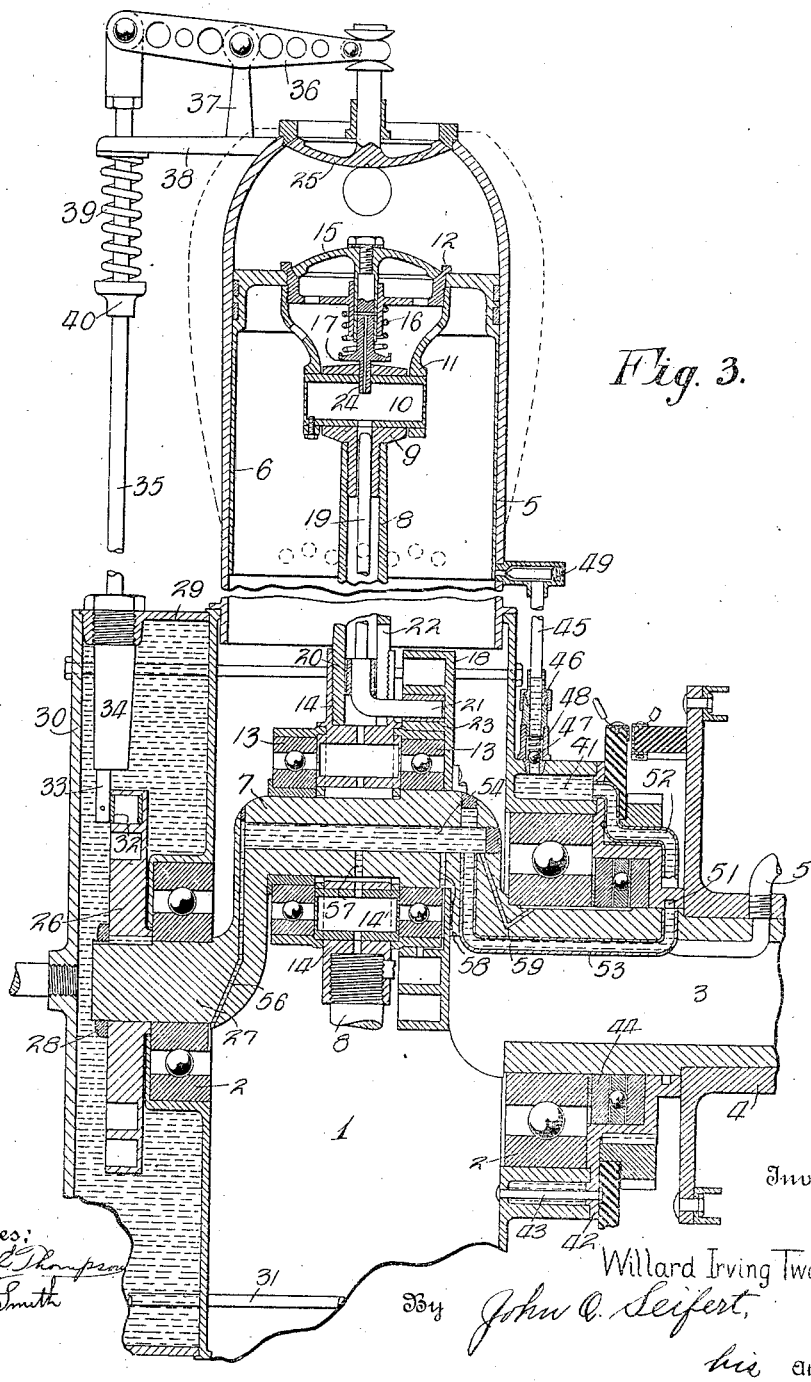

In the drawings accompanying and forming a part of this specification, Figure 1 is a sectional side elevation of a rotary engine taken substantially on the line A—A of Fig. 2, and illustrating my improved lubricating system applied thereto. Fig. 2 is a front elevation, partly in section to illustrate the location of the lubricant distributer and the ducts whereby the lubricant is fed to said distributer and the bearings; and Fig. 3 is an enlarged sectional view taken through one of the cylinders and the casing.

Similar characters of reference designate like parts throughout the different views of the drawings.

In the embodiment of my invention illustrated in the drawings, I have shown the same applied to a rotary engine of the type disclosed by my copending application filed Sept. 19, 1911, Serial No. 650,194, comprising a casing 1, which is in the nature of a fuel-distributing chamber, rotatably mounted by ball bearings 2, 2, on a hollow crank shaft 3 connected to the source of fuel supply, said shaft fixedly carried by a supporting bracket 4. Circumferentially disposed around and secured to said casing to project radially therefrom is a series of cylinders 5. Pistons 6 operating in said cylinders are connected to the crank pin 7 of the shaft 3 to rotate with the cylinders about said pin as an axle. The connection of the pistons to the crank pin consists of hollow connecting rods 8 connected to the pistons by means of heads 9 mounted on gudgeon pins 10 fixed in hangers 11 releasably connected to removable valve seats 12 in the piston heads. The other ends of the rods are connected to a pair of revolving members 13 on the crank pin by members 14 and pins 14'.

The charge of fuel to the cylinders is controlled by valves 15 slidably supported in the valve seats 12 in the piston heads, and normally seated by means of springs 16 confined between the valve seats and the heads of studs 17 connected to the valve stems. The valves are opened by means of a valve-operating cam 18, comprising a disk mounted on the crank pin and having a pair of concentric and intersecting grooves in the face thereof with the outer groove having an eccentric portion or dwell for substantially 180 degrees. Cam-followers consisting of rods 19 slidably mounted in bushings 20 in the connecting rods having a portion 21 projecting through a slot 22 in said rods and upon which are pivotally mounted shoes 23 to engage in the cam grooves, the said rods adapted to engage with projecting portions 24 of the valve studs 17 to open the valves.

The exhaust from the cylinders is controlled by means of valves 25 in the heads of the cylinders, the operations of which are controlled by valve-operating cam 26 keyed to the projecting portion 27 of the shaft 3, the said cam being substantially similar to the cam 18 and secured in place by a nut 28, the said nut also serving to maintain the engine against axial movement on the shaft. The cam 26 is inclosed in a lubricant-containing housing at one end of the casing, comprising an annular member 29, one end of which abuts against the casing with the outer end closed by a plate 30 and held in position by tie-rods 31 passing through said plate and the casing 1. Cam-following shoes 32 engage in the raceway of the cam 26 connected to tappets 33 slidably mounted in bushings 34 secured in the annular member 29, rods 35 being connected at one end to said tappets and at the other end to rockers 36 fulcrumed to studs 37 fixed in arms 38 projecting laterally from the cylinders, said rockers also connected to the stems of the valves 25. The valves are normally maintained closed by means of springs 39 coiled about the rods 35 and confined between the arms 38 and adjustable collars 40 on the rods.

The casing 1 is provided at one end with a lubricant-distributing reservoir, in the present instance comprising an annular recess 41 the outer end of which is closed by a cap 42 secured to the casing by bolts 43, the said cap also inclosing a thrust bearing 44 when the engine is utilized for aeronautical purposes and a propeller fixed to the plate 30 at the forward end of the engine, the said bearing taking up any forward pull or thrust of said propeller. The distributing reservoir is connected to the respective cylinders by sectional conduits 45 connected by couplings or unions 46, the said conduits being provided with check valves to normally shut off the flow of oil from said distributing reservoir to the cylinders, and are shown as comprising a ball 47 normally seated by a spring 48 in one of the conduit sections. Needle valves 49 are also provided to regulate the flow of the lubricant, the said valves engaging in the cylinders and one of the conduit sections connected thereto. The conduits 45 are preferably in sections connected by couplings, as shown, to facilitate the removal of the cylinders and to get ready access to the check valves.

Lubricant is fed by gravity to the distributing reservoir from a lubricant-containing tank (designated in a general way by T) by means of a duct 50 always in communication with an annular duct 51 in the cap 42, a duct 52 leading from the duct 51 to the distributing reservoir. A second duct 53 leads from the annular duct 51 up through the offset of the crank to a duct 54 in the crank pin, which is in the nature of a distributer duct, ducts 56, 57, 58 and 59 leading from said duct 54, the ducts 56 and 59 lead to the bearings 2; the duct 57 leads to the connections of the piston rods 8 to the revolving members 13 from whence the lubricant flows through said rods to lubricate the valve-opening rods 19, gudgeon pins 10 and the valve studs 17. The gudgeon pins 10 and 14' are preferably tubular with the ends closed and provided with holes to permit of the lubricant to pass therein, and the members 14 are provided with holes to normally register with the holes in the pins 14', whereby as the lubricant drips from the duct 57 it will enter the holes in the members 14 and pins 14'. The bushings 20 are provided with longitudinal grooves to permit of the flow of the lubricant through the piston rods and into the pins 10, from whence it is fed through an opening in the studs 24 to the valve stems. The duct 58 leads to the inlet-valve operating-cam 18, the walls of the cam grooves of which are provided with holes in the lower portion thereof so that the lubricant will drip from one groove to the other and be carried around by the cam-follower shoes 23. As the engine revolves and the lubricant in the distributing reservoir is thrown outward by centrifugal action it will unseat the balls 47 permitting the lubricant to flow through the conduits 45 to the inner cylinder walls to lubricate the pistons. However, as soon as the engine comes to rest or is stopped the balls are seated by the springs 48 automatically shutting off the flow of lubricant. This is essential in view of the fact that should the engine be stopped for a short period, the pistons in the cylinders at the bottom or projecting downwardly would be in position to uncover the ducts leading from the needle valves permitting the lubricant to flow into and flood the combustion chambers of the cylinders.

The ducts 50, 53 are preferably in the form of removable tubes to facilitate the removal and cleaning thereof should they become clogged in any manner.

The lubricant for the pistons and bearings are preferably light bodied and easy flowing, while the lubricant in the chamber 29 may be a heavy bodied slow flowing lubricant. Any lubricant which may drip from the bearings or ooze out through the bearings of the chamber 29 to the casing 1, will be thrown outwardly by centrifugal action through the valves in the pistons and into the cylinders, from whence it will be ejected with the exhaust. The duct 50 leading from the lubricant-tank may be provided with a suitable valve to shut off the flow of lubricant when the engine is to be at rest for any considerable period to prevent the dripping of the lubricant from the ducts leading to the bearings into the casing 1 and flooding the same.

From the foregoing description it will be obvious that I provide an improved lubricating system for a rotary engine in which the lubricant is caused to flow by centrifugal action from a lubricant-distributing reservoir to the cylinders to lubricate the pistons, which flow is automatically shut off when the engine comes to rest thereby preventing the flooding of the combustion chambers with lubricant, the distributing reservoir being constantly supplied, as well as the bearings of the engine, with lubricant by gravity.

Variations may be resorted to within the scope of my invention.

Having thus described my invention, I claim:

1. A rotary engine, comprising in combination with a fixed crank shaft, and a series of cylinders and coöperating piston mechanism rotatable about said shaft, of a lubricant-containing reservoir connected to and rotatable with the cylinders, whereby as the engine rotates the lubricant in the reservoir is thrown outward through the action of centrifugal force and caused to flow through the reservoir and cylinder connections to the inner cylinder walls to lubricate the pistons.

2. A rotary engine, comprising in combination with a rotatable crank case and cylinders with coöperating piston mechanism, of an annular lubricant-distributing reservoir in one end of the case; and conduits to connect the reservoir with the cylinders exterior thereof, whereby as the engine rotates the lubricant in the reservoir is thrown outward through the action of centrifugal force and caused to flow through the said conduits from the reservoir to the inner cylinder walls to lubricate the pistons.

3. A rotary engine, comprising in combination with a fixed shaft, a crank case and cylinders with coöperating piston mechanism rotatable about said shaft, of an annular lubricant-distributing reservoir in one end of the case; conduits to connect the reservoir with the cylinders exterior thereof; and spring influenced check valves in said conduits to normally shut off the flow of lubricant through said conduits from the reservoir to the cylinders; the lubricant in the reservoir as the engine rotates being thrown outward through the action of centrifugal force opening said valves and causing the lubricant to flow through the conduits to the inner cylinder walls to lubricate the pistons.

4. A rotary engine, comprising in combination with a fixed shaft, a crank case and cylinders with coöperating piston mechanism rotatable about said shaft, of an annular lubricant-distributing reservoir in one end of the case; conduits to connect the reservoir with the cylinders exterior thereof; spring influenced check valves in said conduits to normally shut off the flow of lubricant through said conduits from the reservoir to the cylinders; the lubricant in the reservoir as the engine rotates being thrown outward through the action of centrifugal force opening said valves and causing the lubricant to flow through the conduits to the inner cylinder walls to lubricate the pistons; and needle valves engaging in the cylinder walls and to which the conduits are connected to regulate the flow of lubricant.

5. In a rotary engine, the combination of a fixed crank shaft having a duct; a lubricant containing tank connected to said duct; a crank case rotatable on said shaft; an annular lubricant reservoir in one end of said case communicating with the duct in the shaft whereby the lubricant is fed by gravity from the tank to said reservoir; cylinders fixed to said case; pistons for the respective cylinders; and conduits to connect the reservoir with the respective cylinders, whereby as the engine rotates the lubricant in the reservoir is thrown outward through the action of centrifugal force and caused to flow through the ducts to the inner cylinder walls to lubricate the pistons.

6. A rotary engine, comprising in combination a crank shaft having a duct; a lubricant supply tank connected to said duct; a crank case with cylinders fixed thereto and coöperating piston mechanism rotatable on said shaft; an annular recess in one end of the case; a plate or cover removably secured to the case to close the open end of said recess whereby it constitutes a lubricant-containing reservoir; an annular duct or recess in said cover always in communication with the duct in the shaft; a duct leading from said annular duct to the reservoir; conduits to connect said reservoir with the cylinders, whereby the lubricant is fed by gravity to said reservoir and as the engine rotates the lubricant in the reservoir is thrown outward through the action of centrifugal force and caused to flow through the conduits to the inner cylinder walls to lubricate the pistons.

WILLARD IRVING TWOMBLY.

Witnesses:
JOHN O. SEIFERT,
PAULA PHILIPP.